US012507946B1

(12) United States Patent
Shah

(10) Patent No.: US 12,507,946 B1
(45) Date of Patent: Dec. 30, 2025

(54) AI-DRIVEN DERMATOLOGICAL IMAGING AND PREDICTIVE SIMULATION PLATFORM FOR PIGMENT AND LESION REDUCTION

(71) Applicant: Raoul Shah, West Palm Beach, FL (US)

(72) Inventor: Raoul Shah, West Palm Beach, FL (US)

(73) Assignee: AutoWrap Robotics LLC

( * ) Notice: Subject to any disclaimer, the term of this patent is extended or adjusted under 35 U.S.C. 154(b) by 0 days.

(21) Appl. No.: 19/308,214

(22) Filed: Aug. 23, 2025

(51) Int. Cl.
| | | |
|---|---|---|
| *A61B 5/00* | (2006.01) | |
| *A61B 5/103* | (2006.01) | |
| *A61B 5/107* | (2006.01) | |
| *G06T 7/00* | (2017.01) | |
| *G06T 7/90* | (2017.01) | |

(Continued)

(52) U.S. Cl.
CPC ............ *A61B 5/444* (2013.01); *A61B 5/1032* (2013.01); *A61B 5/1079* (2013.01); *A61B 5/443* (2013.01); *A61B 5/7267* (2013.01); *A61B 5/7465* (2013.01); *G06T 7/0016* (2013.01); *G06T 7/90* (2017.01); *G06V 10/17* (2022.01); *G06V 10/70* (2022.01); *A61B 2576/02* (2013.01); *G06T 2207/30088* (2013.01); *G06T 2207/30096* (2013.01); *G06V 2201/03* (2022.01)

(58) Field of Classification Search
CPC ....... A61B 5/444; A61B 5/443; A61B 5/1032; A61B 5/1079; A61B 5/7465; A61B 5/7267; G06T 7/90; G06T 7/0016; G06V 10/17; G06V 10/70

USPC .......................................................... 382/128
See application file for complete search history.

(56) References Cited

U.S. PATENT DOCUMENTS 9,996,923 B2 6/2018 Thomas
11,672,469 B2 6/2023 Adiri et al.
(Continued)

OTHER PUBLICATIONS

Kirby, W.; Desai, A.—The Kirby-Desai Scale: A Proposed Scale to Assess Tattoo-removal Treatments, Archives of Dermatology, Dec. 2009, vol. 145(12), pp. 1364-1369, American Medical Association, Chicago, USA.

(Continued)

*Primary Examiner* — Kenny A Cese

(57) ABSTRACT

A hardware-agnostic, cloud-based software platform that improves the functioning of a computer system by processing multi-modal dermatological images to quantify pigment change, forecast outcomes, and generate predictive simulations. The system applies a lighting normalization protocol that performs a deformable registration using stable epidermal micro-landmarks and is conditioned by image capture metadata. A predictive model performs non-linear regression on a multi-dimensional dataset including skin phototype, ink composition, and treatment parameters to produce fade-curve projections with confidence scoring. The platform aggregates anonymized global treatment data into a cryptographically verifiable ledger using SHA-256 hash chaining, enabling continuous AI retraining and providing a persistent, auditable record. The system operates with patient- and operator-facing interfaces, delivering progress tracking and simulation results independently or by integrating with optional calibrated imaging devices and/or robotic positioning arms.

17 Claims, 6 Drawing Sheets

(51) Int. Cl.
*G06V 10/10* (2022.01)
*G06V 10/70* (2022.01)

(56) References Cited

U.S. PATENT DOCUMENTS

| | | |
|---|---|---|
| 11,676,705 B2 | 6/2023 | Adiri et al. |
| 12,295,739 B2 | 5/2025 | Adiri et al. |
| 2024/0173562 A1* | 5/2024 | Boskovitz ............ A61B 5/0077 |

OTHER PUBLICATIONS

Candice Menozzi-Smarrito; Nicolas Pineau—A New Predictive Model for Tattoo Removal: Leveraging Patient and Tattoo Characteristics, Journal of Cosmetic Dermatology, Jul. 2025, vol. 24(7), e70186. Wiley Periodicals LLC.

* cited by examiner

AI-DRIVEN DERMATOLOGICAL IMAGING AND PREDICTIVE SIMULATION PLATFORM FOR PIGMENT AND LESION REDUCTION

FIELD OF THE INVENTION

The present invention relates generally to computer-implemented systems and methods for dermatological imaging analytics and predictive simulation. More particularly, the invention is a novel software-only improvement to dermatological imaging and prediction that improves the functioning of a computer system by providing a hardware-agnostic, cloud-based software platform for optimizing, simulating, and tracking dermatological pigment and lesion reduction treatments.

Particular Applications

The invention's primary focus is a software suite encompassing a mobile application, a web dashboard, and a cloud-computing backend for tracking and forecasting dermatological treatment outcomes for both human and non-human subjects. Specific applications include, but are not limited to, tattoo removal, cosmetic camouflage, permanent makeup, pigmentation disorders, scar lightening, birthmark fading, hyperpigmentation treatment, laser skin therapy, and sunspot removal.

BACKGROUND OF THE INVENTION

The field of laser-based dermatological and cosmetic treatments, including but not limited to tattoo removal, hair removal, and skin rejuvenation, is expanding rapidly. However, the efficacy, patient experience, and operational efficiency of current systems are bottlenecked by critical limitations.

These critical limitations include:
Lack of Hardware Interoperability: The industry is fragmented into restrictive hardware-dependent software ecosystems. This vendor lock-in stifles innovation, prevents clinics from adopting best-in-class software independently of their hardware, and makes the aggregation of a universal dataset for a robust AI model technically challenging and commercially prohibitive.
Lack of Quantitative Tracking: There is no industry-standard, objective method for measuring and visualizing treatment progress over time. The subjective nature of progress assessment contributes to patient doubt and dissatisfaction.
No Real-Time Predictive Accuracy: Existing proprietary simulators are often based on static, pre-rendered mockups and lack the ability to provide real-time, data-driven forecasts that adapt to a patient's specific healing response. There is no reliable method to accurately predict when a tattoo will completely fade or to provide a clear, data-driven timeline. This leads to uncertainty and an elevated patient discontinuation rate.
Regulatory and Compliance Gaps: Current systems lack inherent features for ensuring regulatory compliance, such as auditable, immutable logging of treatment parameters and patient consent. This creates a significant burden for clinics to meet standards like HIPAA and GDPR and poses a liability risk.
Elevated Discontinuation Rates: Without visible proof of progress, clear quantitative metrics, or a predictable timeline, patients often abandon expensive, multi-session treatments early, resulting in lost revenue for clinics and poor patient outcomes.

The present invention addresses these deficiencies by providing a comprehensive, software-only platform that unites these disparate functions. This provides a direct solution to the problems of hardware interoperability, data-driven prediction, and regulatory compliance.

BRIEF SUMMARY OF THE INVENTION

In one embodiment, the present invention is a cloud-hosted software platform that improves the functioning of a computer system by ingesting multi-modal imaging data of a dermatological treatment region, processing the data with one or more artificial intelligence models to quantify treatment progress, and generating predictive simulations of a post-treatment appearance with an estimated completion date or session count.

The system presents quantified metrics and forecasts via patient- and operator-facing interfaces. In a key commercial embodiment, the invention is deployed as a software-only, hardware-agnostic platform licensed to clinics via a subscription model. This allows for substantial value to be derived from a patient's own mobile device without a need for a separate dedicated imaging rig.

The platform's technical novelty includes a synergistic combination of technologies that overcome the limitations of the prior art. The system utilizes a lighting-normalization protocol using a capture-metadata-conditioned recalibration and deformable registration using stable epidermal micro-landmarks (e.g., pores, freckles, hair follicles) to correct for tissue deformation and environmental variance across sessions.

The predictive engine performs non-linear regression on a multi-dimensional dataset of clinically relevant variables to generate a patient-specific fade curve projection with a confidence score for its forecasts. The predictive accuracy and reliability of the system's outputs are a direct result of this unique image processing pipeline.

The system also utilizes cryptographic hash chaining of session records for enhanced auditability, which is integral to the system's clinical reliability and commercial deployment.

Advantages Over Prior Art

The present invention provides a number of key advantages over existing systems and methods, including:
Hardware-Agnostic Integration: The platform's software is not tied to a specific hardware device, which eliminates vendor reliance for clinics and allows for rapid adoption across a wide range of new and existing dermatological devices. Crucially, the platform provides substantial value as a standalone, software-only analytics and simulation service, even without direct device integration, such as with a manually uploaded smartphone image.
Deformable Registration and Capture-Metadata Normalization: The system uses a protocol that normalizes for environmental lighting by anchoring to stable epidermal micro-landmarks and conditioned by image capture metadata, ensuring consistent and objective image capture that is superior to prior art methods that rely on fixed rigs or simple photographic alignment.
Multi-Dimensional Predictive Modeling: The core AI model is trained on a comprehensive dataset that includes a wide array of variables, from ink particle size and skin phototype to environmental factors and cross-treatment interference. This multi-dimensional approach results in a level of predictive accuracy and safety unattainable by simpler systems. The improved prediction accuracy is a direct technical result of the unique normalization and registration protocols.

Cryptographically Verifiable Data Repository: The system creates a self-reinforcing data repository by aggregating anonymized treatment data from a global network of clinics. The use of a cryptographic hash chain provides a persistent, auditable, and tamper-evident record, which is a necessary technical foundation for the system's deployment in a regulated clinical environment.

Quantifiable Progress with Confidence Scoring: The system provides objective, data-driven metrics and predictive fade curves with a dynamically-updating confidence score. This directly addresses the industry problem of elevated patient discontinuation rates by managing expectations with verifiable data.

SaaS Model with Geofenced Compliance and Enforcement: The cloud-hosted SaaS deployment with geofencing and remote disable capabilities is a computer-implemented solution that ensures regulatory compliance and enforces licensing terms, protecting the intellectual property from unauthorized use and ensuring the system's commercial viability.

BRIEF DESCRIPTION OF THE DRAWINGS

The accompanying drawings illustrate exemplary embodiments and are incorporated herein to provide a clearer understanding of the invention.

DETAILED DESCRIPTION OF THE INVENTION

Drawing Reference List

Figure 1:
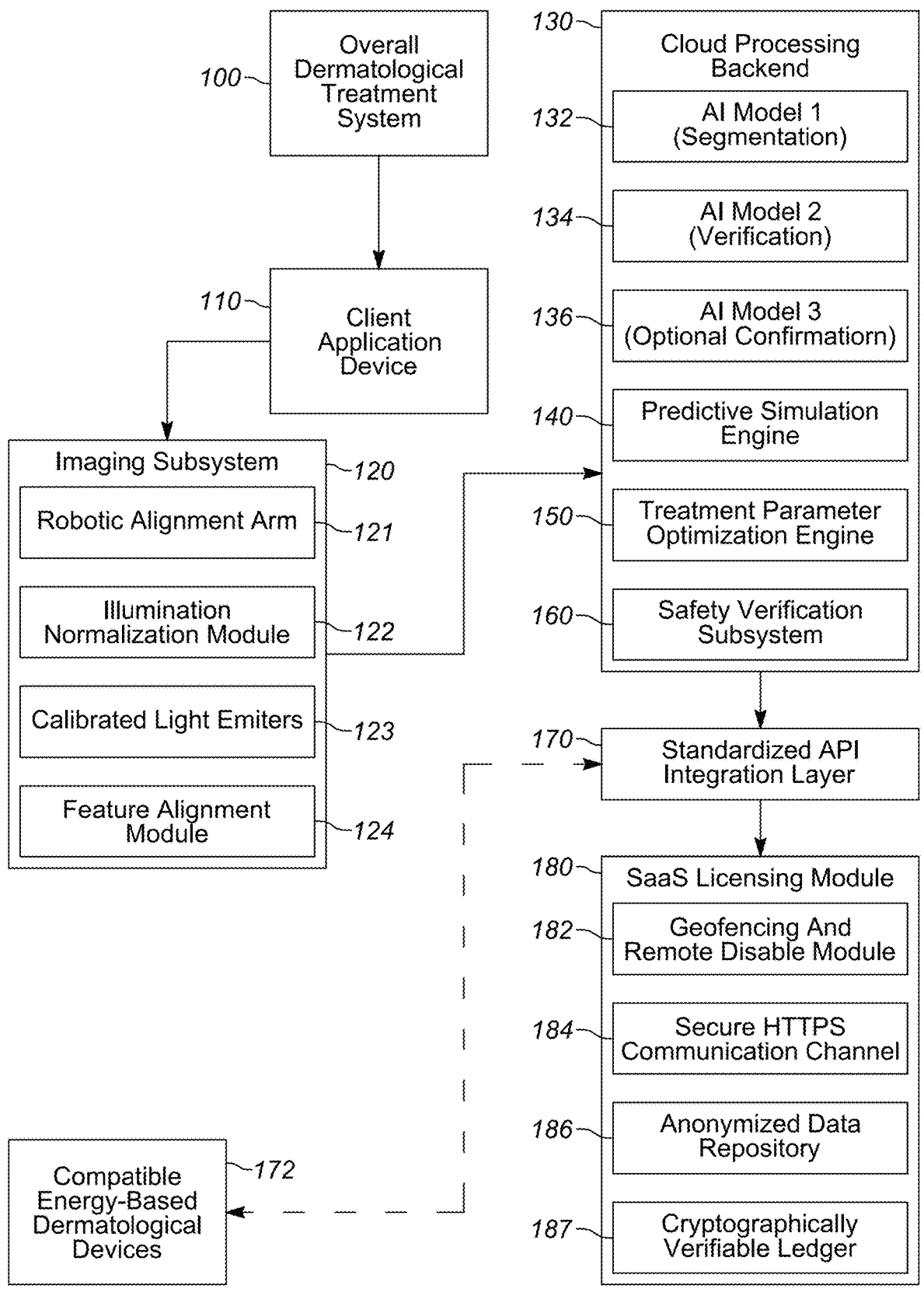
FIG. 1 is a block diagram showing the overall system architecture, including a client application (110), a multimodal imaging subsystem (120), a cloud processing backend (130) with multiple AI engines, a standardized API integration layer (170), and multiple compatible energy-based dermatological treatment devices (172).

FIG. 1—Overall System Architecture: 100—Overall dermatological treatment system; 110—Client application device; 120—Imaging subsystem; 121—Robotic alignment arm; 122—Illumination normalization module; 123—Calibrated light emitters; 124—Feature alignment module; 130—Cloud processing backend; 132—AI model 1 (segmentation); 134—AI model 2 (verification); 136—AI model 3 (optional confirmation); 140—Predictive simulation engine; 150—Treatment parameter optimization engine; 160—Safety verification subsystem; 170—Standardized API integration layer; 172—Compatible energy-based dermatological devices; 180—SaaS licensing module; 182—Geofencing and remote disable module; 184—Secure HTTPS communication channel; 186—Anonymized data repository; 187—Cryptographically verifiable ledger.

Figure 2:
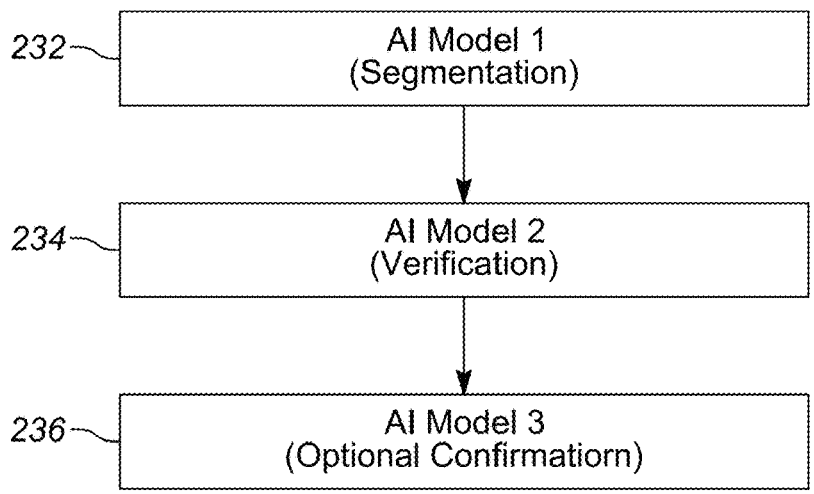
FIG. 2 is a detailed flow diagram of a multi-stage AI verification process, illustrating the cascade of segmentation, verification, optional confirmation, and a final fail-safe review step that requires a minimum confidence threshold to be met.

FIG. 2—Multi-Stage AI Verification: 232—AI model 1 (segmentation); 234—AI model 2 (verification); 236—AI model 3 (optional confirmation).

Figure 3:
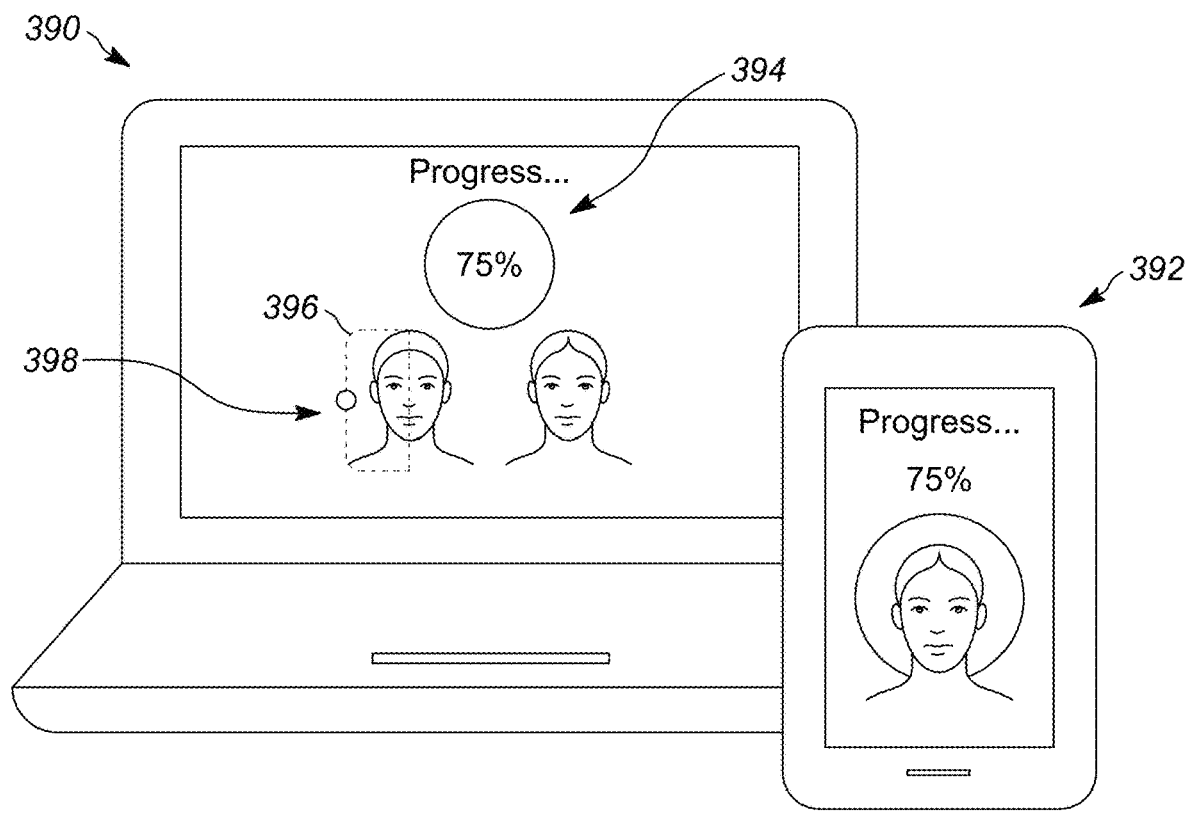
FIG. 3 is an example user interface (UI) displaying a quantitative treatment progress percentage (394), a photorealistic predictive post-treatment simulation of a tattoo fading (398), and an intuitive control panel for recommended treatment parameters.

FIG. 3—User Interface & Predictive Simulation: 390—Clinic-facing UI; 392—Patient-facing dashboard; 394—Progress percentage display; 396—Before/after slider control; 398—Predictive simulation preview.

Figure 4:
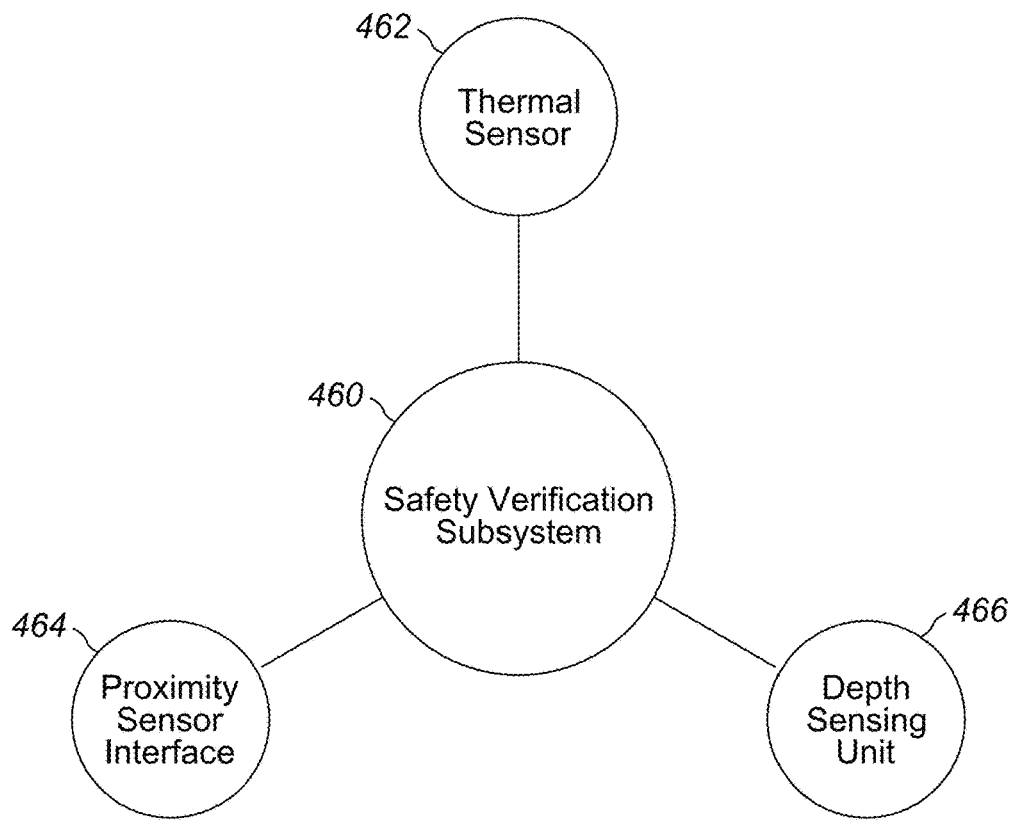
FIG. 4 is a diagram showing the multi-layer safety verification loop, including data inputs from thermal sensors (462), proximity sensors (464), and depth sensing units (466), which all must pass validation before the energy device activation signal is authorized.

FIG. 4—Multi-Layer Safety Verification: 460—Safety verification subsystem; 462—Thermal sensor interface; 464—Proximity sensor interface; 466—Depth sensing unit.

Figure 5:
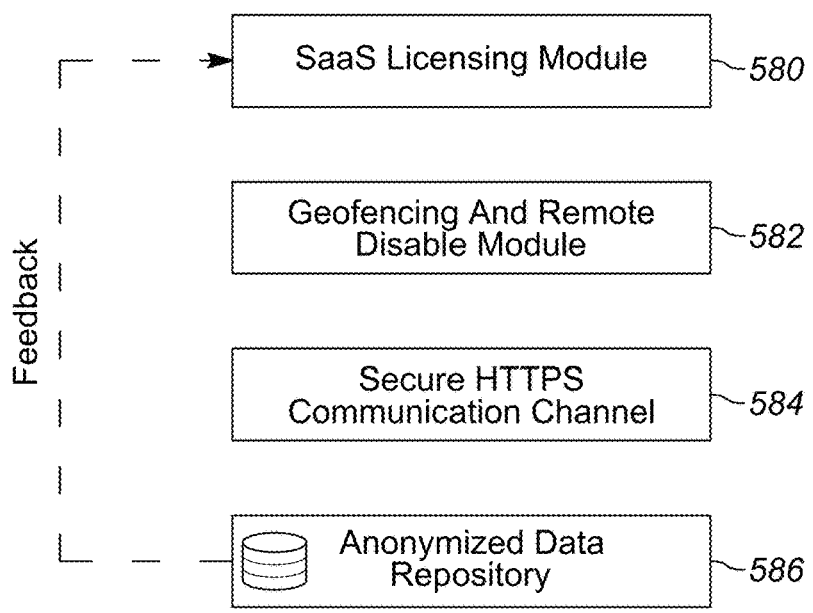
FIG. 5 is a diagram illustrating the SaaS multi-clinic deployment model, including the licensing control mechanisms (580), geofencing (582), secure HTTPS communication channels (584), and the critical feedback loop of anonymized data aggregation for continuous AI model improvement.

FIG. 5—SaaS Deployment & Data Repository: 580—SaaS licensing module; 582—Geofencing and remote disable module; 584—Secure HTTPS communication channel; 586—Anonymized data repository.

Figure 6:
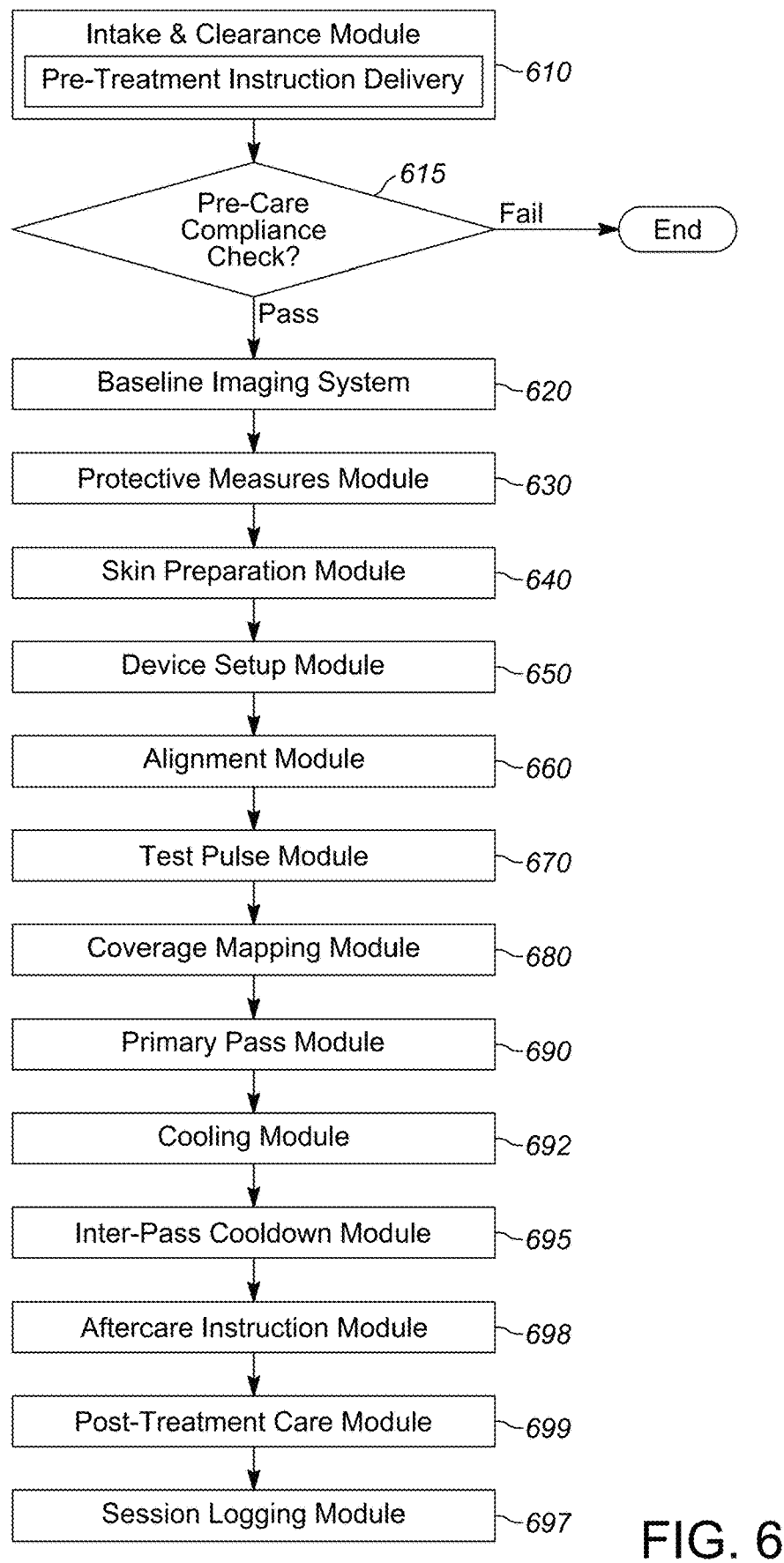
FIG. 6 is a process flow diagram illustrating the software workflow for an autonomous dermatological treatment session, including adverse event handling.

FIG. 6—Software Workflow: 610—Intake & Clearance Module; 620—Baseline Imaging Module; 630—Protective Measures Module; 640—Skin Preparation Module; 650—Device Setup Module; 660—Alignment Module; 670—Test Pulse Module; 680—Coverage Mapping Module; 690—Primary Pass Module; 692—Cooling Module; 695—Inter-Pass Cooldown Module; 699—Post-Treatment Care Module; 698—Aftercare Instruction Module; 697—Session Logging Module.

Figure 7:
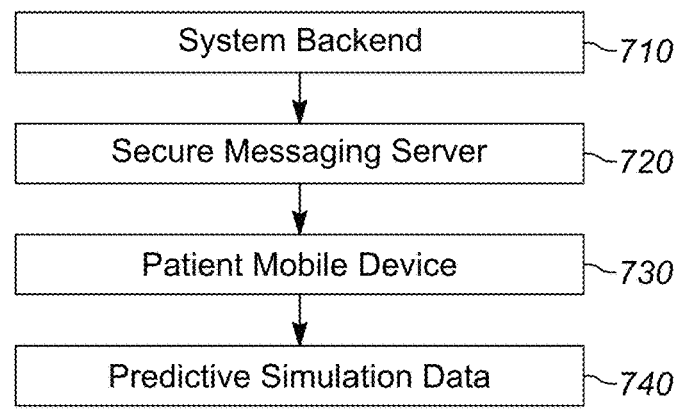
FIG. 7 is a communication sequence diagram illustrating the delivery of predictive simulations and aftercare instructions via a messaging protocol to a client's mobile device (730).

FIG. 7—Communication Sequence Diagram: 710—System Backend; 720—Secure Messaging Server; 730—Patient Mobile Device; 740—Predictive Simulation Data.

Figure 8:
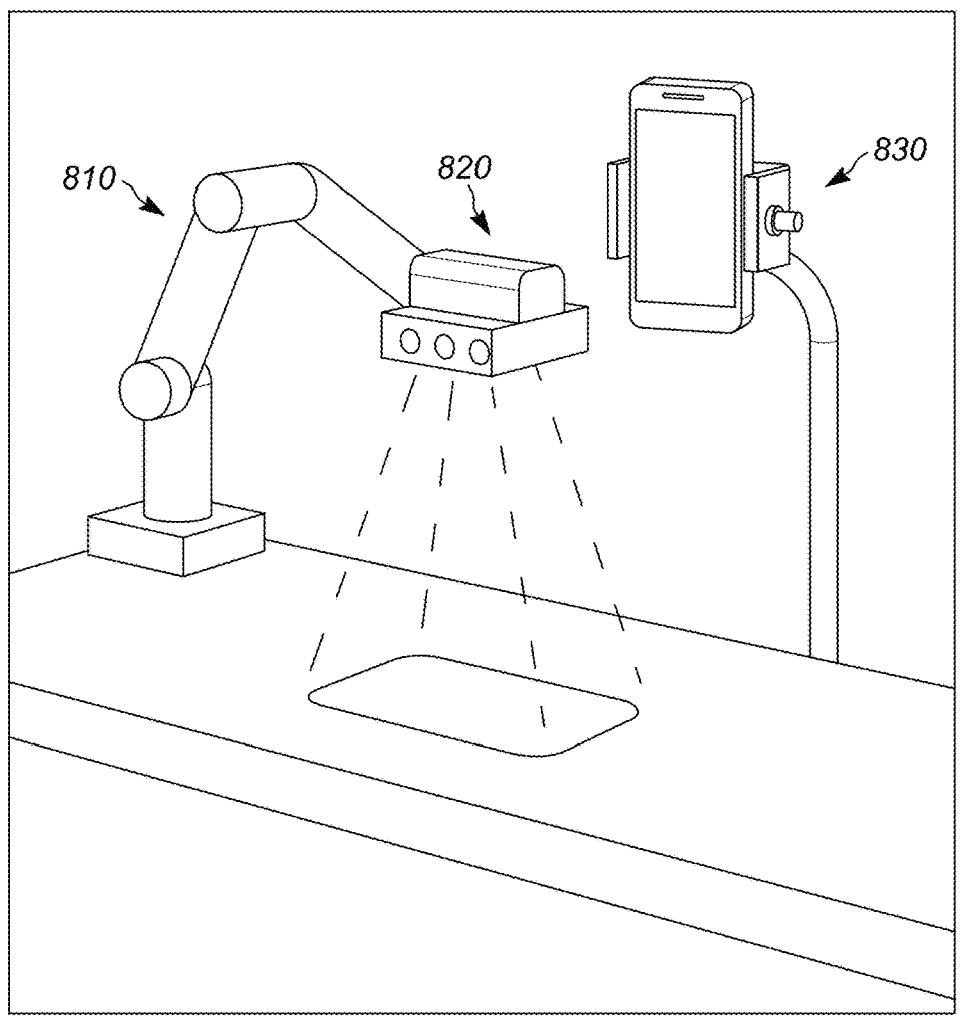
FIG. 8 is a block diagram of the automated imaging subsystem, including a robotic alignment arm (810) and a calibrated light emitter (820).

FIG. 8—Automated Imaging Subsystem: 810—Robotic alignment arm; 820—Calibrated light emitters; 830—Mobile device holder with locking mechanism.

Figure 9:
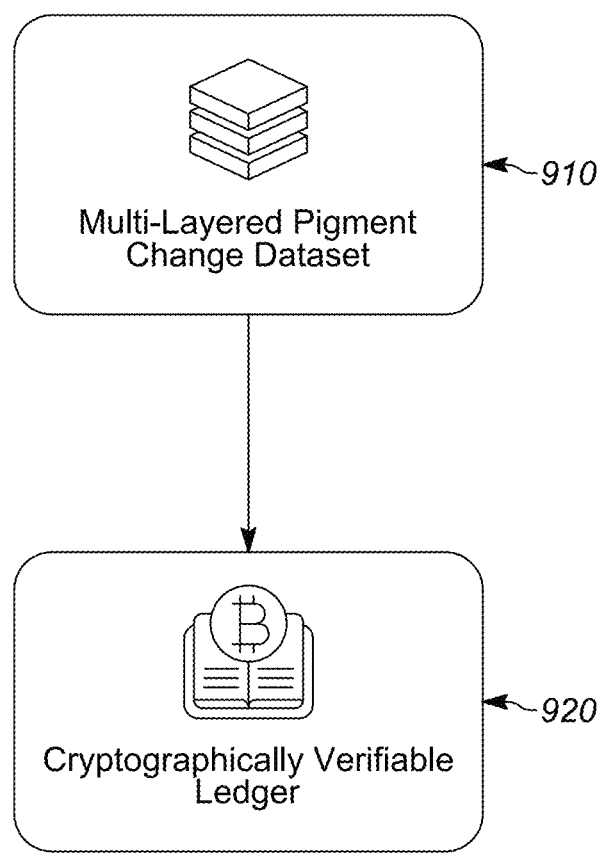
FIG. 9 is a diagram illustrating the data structure with a cryptographically verifiable ledger (920).

FIG. 9—Proprietary Data Structure: 910—Multi-layered pigment change dataset; 920—Cryptographically verifiable ledger.

System Architecture (FIG. 1, 8)

The system 100 is designed as a modular, distributed platform. It includes a local client application 110 that communicates with a multi-modal imaging subsystem 120 and a remote cloud processing backend 130 via a secure HTTPS channel 184. The platform supports a manual operator override to address safety and compliance concerns, ensuring a human can take immediate control at any time.

The client application can be presented on a standard desktop or tablet, or through an augmented reality (AR) headset for head-up display and guided procedure execution by an operator. A standardized API integration layer 170 facilitates communication with a wide array of compatible energy-based dermatological devices 172 from different manufacturers, thus achieving hardware agnosticism.

Crucially, the system is a software-only platform whose functionality is fully realized even in the absence of a robotic alignment arm 121 or an integrated dermatological device 172. In this embodiment, a user may manually upload images, including those from a smartphone, for analysis, predictive simulation, and progress tracking, with the system's core functionality residing in its backend processing and predictive capabilities.

The imaging subsystem 120 includes an optional mobile device holder 830 with a locking mechanism for precise distance and angle, which can be affixed to an alignment apparatus to position the camera for perfect repeat imaging angles.

Unique Technical Methods

The system incorporates several unique technical methods for enhanced accuracy. The illumination normalization module 122 utilizes an AI-based lighting recalibration algorithm anchored to stable epidermal micro-landmarks (e.g., pores, hair follicles, freckles, small scars, moles, or unique skin texture patterns) and is conditioned by image capture metadata to ensure consistent color and lighting conditions regardless of the ambient environment. This metadata may include, but is not limited to, focal length, exposure time, ISO, white balance, lens model, distance proxy, and illumination type, which are extracted from standard fields such as EXIF/DICOM or device logs.

The feature alignment module 124 uses a deformable registration algorithm to account for tissue deformation, stretching, or swelling by identifying micro skin features as anchor points for image registration between sessions. The system's pigment reduction measurement is machine-learned from a verified baseline dataset, allowing it to improve its accuracy over time with each treatment session.

The invention implements a specific technological improvement in computer-based dermatological image analysis by introducing this unique combination of a capture-metadata-conditioned normalization protocol and deformable registration using micro-landmarks, which is not a mere abstract idea but a concrete technical process executed in a computing environment.

By applying this illumination normalization and deformable registration pipeline, the system dramatically reduces the computational complexity and processing time required for the downstream AI models. Instead of the AI having to learn to filter out environmental noise, lighting variance, and tissue deformation, it receives a pre-processed, consistent, and "clean" dataset.

This technical improvement allows the AI models to converge on a solution faster and more efficiently, directly improving the speed and performance of the computer's processing unit. The predictive accuracy of the system's forecasts is a direct, technical result of this unique image processing pipeline.

Detailed Enablement of AI Models and Data Repository

The AI models are trained using a centralized dataset of anonymized treatment data. The data repository 186 comprises a comprehensive, non-limiting list of predictive variables that are used as inputs for the AI models, including:

I. Ink-Related Predictive Variables: Ink color classification, ink composition (carbon-based vs. metallic pigments), ink density, ink layering, a learned particle-size proxy (AI-estimated granule size reduction across sessions), and immune-system-driven clearance rates.

II. Skin-Related Predictive Variables: Skin phototype (AI-detected from baseline images and manual input), skin thickness by anatomical location, scarring/keloid tendency, pigment depth in dermis (AI-estimated from color dispersion patterns and light scatter), and melanin density.

III. Tattoo Age & Condition Variables: Tattoo age, sun exposure history (UV-induced fading patterns), pre-existing scar tissue, and prior removal attempts.

IV. Treatment & Device Variables: Laser class (picosecond vs. nanosecond), pulse duration, wavelength(s) per pass, wavelength sequencing, spot size, fluence (energy density), pulse repetition rate, pass overlap rate, operator dwell time, fractional or diffractive lens mode (AI-detected via image pattern analysis), cooling protocol, and energy stacking history.

V. Biological Healing Response Variables: Immune system efficiency, hydration level, circulation quality, lifestyle factors (smoking, alcohol, exercise patterns), and autoimmune/inflammatory skin conditions.

VI. Environmental Context Variables: Local humidity, local temperature, UV index, and altitude.

VII. Session-to-Session Imaging Variables: Capture-metadata-conditioned illumination normalization, micro-feature-based deformable registration, and thermal profile mapping (AI-estimated skin temperature from imaging post-pass).

VIII. Cross-Treatment Interference Variables: Concurrent dermatology services (e.g., melasma, acne scar treatment overlap) and skin resurfacing history.

IX. Predictive Model Output Enhancements: Fade percentage with trend line and error margin, a dynamically-updating confidence score, estimated completion date, and optimized inter-session interval.

X. Data & Compliance Infrastructure: Cryptographically verifiable ledger and geofenced SaaS licensing.

This multi-dimensional dataset allows the platform to build a robust and highly accurate predictive model, with accuracy validated within +3% based on a clinical validation set. The predictive simulations generated by the GAN or diffusion model are directly conditioned by this multi-dimensional dataset and the patient-specific fade curve, ensuring a non-obvious, medically relevant output rather than a generic image generation. In addition to real-world clinical data, initial AI models can be trained on synthetic or simulated datasets to establish a baseline of functionality before deployment in clinical environments.

The AI can be retrained or fine-tuned with region-specific datasets to comply with local skin-type distributions and regulatory safety standards without hardware modification. The platform further includes on-device or local fine-tuning capabilities, where the AI model is incrementally improved from individual clinic results while maintaining data privacy, enabling even edge deployments to enhance their local efficacy.

The system also maintains a persistent, per-client "pre-care profile" that functions as a digital twin, storing historical response curves and compliance data to optimize instructions even if the client switches providers. The system is also designed for cross-platform interoperability with external health ecosystems, such as Electronic Health Records (EHRs) and wellness apps, allowing the AI to access and synthesize data for a more holistic patient profile.

All data is anonymized to remove any personally identifiable information (PII) before storage. Data collection and usage are governed by regional regulations, with the platform's geofencing module 182 ensuring compliance, and patient consent is a prerequisite for data contribution. The system's logs are structured for compatibility with medical device standards such as HIPAA and GDPR, including immutable, auditable records of all treatment parameters, safety events, and operator actions.

The system employs SHA-256 cryptographic hashing to link session records. A hash of the current session's data (including treatment parameters, image analysis results, and a timestamp) is computed and appended to the data block. This hash is then included in the data of the subsequent session, creating a tamper-evident, cryptographically verifiable ledger. This hash chain ensures that any unauthorized modification to a historical record would invalidate the hash of all subsequent entries.

The system can also automatically generate proof-of-compliance reports for regulatory audits and insurance claims for elective procedures based on logged pre- and post-treatment compliance data. The use of this cryptographic audit chain is integral to the system's clinical reliability and commercial deployment, enabling it to function as a trusted tool in a regulated medical environment.

The training pipeline operates on a continuous basis. As new anonymized data is collected from subscribing clinics, it is added to the repository 186. The AI models (132, 134, 136, 140) are periodically retrained on this ever-growing dataset. Once an improved model version is validated, it is automatically deployed to all subscribing clinics, providing a continuous, value-added benefit for all users and strengthening the platform's network effect.

Hardware-Agnostic Integration

The standardized API integration layer 170 is designed to communicate with diverse hardware. The platform's software is the core product, and it communicates with any compatible hardware via this API. The API defines a set of generic commands that are abstracted from vendor-specific implementations. The platform is deployed as a cloud-hosted SaaS. Client applications 110 are authenticated via the SaaS licensing module 180. An on-device AI chip can be used for local inference and analysis to ensure real-time feedback and HIPAA compliance, with batch synchronization to the cloud for model retraining.

AI Model Pipeline Example

In an exemplary embodiment, a ResNet-50 neural network architecture is used for the segmentation model 232 to identify the treatment boundary. The predictive simulation engine 140 utilizes a diffusion model or a Generative Adversarial Network (GAN). The GAN is initialized and trained on a curated dataset of paired images from verified clinical cases. This dataset comprises "before" images of pigment patterns and corresponding "after" images captured at various stages of the treatment process.

The GAN's generator is configured with an encoder-decoder architecture that learns to map the input image (e.g., a tattoo pre-treatment) to a plausible post-treatment outcome. The discriminator is trained simultaneously to distinguish between real "after" images from the dataset and the simulated images produced by the generator.

To ensure a robust and medically relevant output, the training dataset is heavily conditioned on the multi-dimensional variables detailed in section [0040], including skin type, pigment depth, and laser parameters. The model can also be fine-tuned using a smaller, patient-specific dataset after the first few sessions, allowing it to adapt to an individual's unique healing response and improve the accuracy of its forecasts.

This ensures the output is a concrete technical result, not a generic image generation, and is directly tied to the dermatological data of the invention. The predictive simulation's accuracy and confidence score are a synergistic result of the unique capture-metadata-conditioned normalization, micro-landmark registration, and multi-dimensional predictive modeling. This pipeline can be validated and deployed across the network of client devices.

Licensing-Oriented Embodiment: SaaS Deployment for Clinics

In a preferred commercial embodiment, the platform functions as a SaaS solution for tattoo removal clinics. The system receives multi-modal image data from a clinic's existing device or from a patient's mobile device, processes the data on the cloud backend 130, and presents the results (e.g., progress tracking, predictive simulation) to the user via the patient and operator dashboards (392, 390).

The predictive fade curve, with its confidence score and estimated completion date, serves as a crucial tool during the initial consultation to set realistic patient expectations. By providing a clear, data-driven visual proof of progress after each session, the platform directly addresses the industry's high patient drop-off rate, thereby increasing clinic revenue and improving patient satisfaction.

In this embodiment, the API integration layer 170 and safety subsystem 460 are not used for direct device control, but the system still generates significant value by quantifying progress, managing patient expectations, and improving the clinic's business operations.

On-Premise Deployment Embodiment

In another alternative embodiment, the platform may be deployed as an on-premise server. The system also supports an edge inference scenario, where a subset of the AI models runs locally on the client device for low-latency feedback, with batch synchronization to the cloud repository when a connection is available. Furthermore, the system can employ a federated learning model for select aspects, such as optimizing the pre-treatment instruction module.

This process allows the AI to learn from local data on client devices without the raw data ever leaving the clinic's premises, thereby maintaining a high degree of data privacy. The federated learning model is a specific technical solution to a data and efficiency problem. By training a local model on each client device and securely aggregating only the model weight updates—not the raw data—the system avoids the massive data transfer overhead that would be required for a centralized training model. This method significantly reduces network bandwidth usage and cloud storage requirements, thereby improving the overall efficiency and scalability of the computer system.

The process involves the following steps:
a) A global AI model is initially pushed to a plurality of client devices.
b) Each client device (clinic) trains its local model on its own private, anonymized data, generating a set of model weight updates.
c) These weight updates, not the raw data, are sent securely to a central server.
d) The central server securely aggregates the weight updates from all participating clients using a secure multiparty computation protocol. This aggregation combines the learning from all clinics into a single, improved global model.

e) The updated global model is then pushed back to all client devices for future use.

This approach ensures that the model improves from a larger, more diverse dataset while complying with strict data privacy regulations. The system also supports on-device or local fine-tuning capabilities, where the AI model is incrementally improved from individual clinic results while maintaining data privacy, enabling even edge deployments to enhance their local efficacy.

Full Human-to-Robot Methodology for Laser Dermatological Treatment (FIG. 6)

The following sequence describes the clinical procedure a human operator would perform, with each step translated into a software module or API command set:

Client Intake & Clearance (610)—Pre-Treatment Instruction Automation Module. The system can also detect pre-care compliance via a wearable sensor that senses skin temperature and can either prevent the procedure from starting until compliance is verified, or auto-adjust treatment parameters in real-time if compliance is incomplete.

Baseline Imaging (620)
Protective Measures (630)
Skin Preparation (640)
Device Setup (650)
Patient & Beam Alignment (660)
Test Pulse (670)
Coverage Mapping (680)
Primary Pass (690)—If the system detects that pre-care compliance was not met, it can automatically adjust laser fluence and pulse duration for safety and comfort.
Post-Treatment Instruction Module
Inter-Pass Cooldown & Optional Second Pass (695)
Session Logging (697)

Adverse Events & "Little Steps" to Handle

This section details the system's ability to handle various adverse events by combining sensor input with AI-driven logic and predefined action states. The safety verification subsystem (460) can operate as a standalone module to be retrofitted onto existing devices.

Treatment Progress Tracking & Predictive Simulation (FIG. 3)

The platform features a dual-dashboard approach. The predictive simulation engine 140, trained on anonymized historical data from thousands of dermatological treatments, generates a photorealistic, multi-session simulation preview 398 of the expected outcome. The prediction engine uses a plurality of variables from the aforementioned dataset, including the patient's measured fade rate curve, skin type classification, historical laser power logs, and healing response, to forecast a completion date or session count.

It also provides a confidence score that updates dynamically with new data after every session.

Parameter Optimization

The optimization engine 150 dynamically recommends optimal treatment parameters, including wavelength ranges for specific pigment types. This recommendation is based on a complex algorithm that considers the patient's specific skin type, the characteristics of the pigment (e.g., color, density, and depth), and the efficacy data from the global anonymized repository 186. This ensures the most effective and safest treatment plan is executed.

Multi-Layer Safety Verification (FIG. 4)

The safety verification subsystem 460 is a critical, non-bypassable component. The closed-loop compliance and safety subsystem (460) is a non-bypassable, computer-implemented control layer that improves system reliability and safety. By requiring a minimum confidence threshold and real-time sensor verification before activating a device, the system prevents erroneous or unsafe operations. This technical improvement reduces computational errors and improves the reliability of the entire system, preventing potential harm and thereby enhancing the computer system's core function as a safe, effective control mechanism for a dermatological device.

SaaS Deployment & Data Repository (FIG. 5, 9)

The invention's business model is powered by its SaaS deployment. Most critically, every treatment session across the globe contributes anonymized treatment data to a centralized data repository 586. This creates a self-reinforcing data repository, a feedback loop where the AI models continuously improve with every treatment performed, making the platform more valuable and difficult for competitors to replicate.

The licensing module (180) includes a geofencing and remote disable module (182) that provides technical enforcement of licensing agreements. This is not a mere business method; it is a computer-implemented solution that improves the functioning of the system.

a) Geofence Enforcement: The client application on a user's device (110) continuously monitors its physical location using a combination of GPS data, Wi-Fi triangulation, and device IP address lookup. Before a session can be initiated or a predictive simulation can be generated, the client device communicates its location to the licensing module (180). This module cross-references the device's location against the geofenced boundaries defined in the licensing agreement. If the device's location is outside the authorized zone, the system prevents the execution of core functions, thereby enforcing the licensing terms technically.

b) License Server Checks: The platform requires periodic, authenticated communication with a license server via a secure HTTPS channel (184). During this check, the server verifies the license status, subscription validity, and compliance with the geofenced location.

c) Remote Disable: In the event of a licensing violation (e.g., lapsed subscription, location violation, or attempted unauthorized use), the remote disable module (182) can transmit a command to the client application. This command can temporarily or permanently disable critical functions of the platform, such as the ability to save new sessions or generate predictive outputs.

This technical mechanism protects the intellectual property from unauthorized use and ensures compliance. The geofence enforcement and cryptographic audit chain are integral to the system's ability to operate reliably in a regulated clinical and commercial environment, and are not a separate, non-technical feature.

Additional Embodiments

The core methodologies and systems described herein can be extended to additional applications. For example, the predictive simulation and planning engine can be adapted for use in AR/VR environments to allow practitioners to pre-visualize treatment plans on a client's skin. The platform's predictive models are also extensible to non-laser pigment and lesion treatments, such as chemical peels, microneedling, and topical therapies, with the data logging and predictive capabilities remaining central to the method. Furthermore, the foundational AI for pigment analysis and tracking is fully applicable to veterinary dermatology for non-human subjects.

In another embodiment, the system may be deployed with a portable, AI-guided laser device intended for at-home consumer use under strict regulatory and safety protocols. Such devices may obtain FDA clearance for limited, shallow ink or pigmentation reduction. Comparable to high-end consumer hair removal devices (e.g., Tria® or Braun® IPL), these systems would integrate identity verification, operator authentication, and multi-layer safety checks before enabling treatment. The device would be connected to the cloud-based platform via a secure channel, automatically tracking fade progress, storing results in a patient record, and transmitting the data to a licensed dermatologist or clinic for remote oversight and approval.

In another embodiment, the system may be deployed in residential buildings, wellness centers, gyms, or luxury apartment complexes as "ink fade stations"-small, private treatment rooms containing an AI-guided device connected to the platform. Access may be rented by the hour, with the user booking via the companion mobile application. Upon arrival, the system would scan the treatment area, auto-calibrate laser parameters, and transmit the scan to a remote medical professional for verification before initiating treatment. This model allows property owners or wellness facilities to offer tattoo removal or pigment reduction as an amenity, similar to a gym or pool, with the platform licensed directly to these community health rooms without the need for the licensor to own the physical hardware.

In another embodiment, the platform may be integrated into mobile or temporary treatment installations, such as vans, trailers, or pop-up kiosks, each containing an AI-guided removal setup. These mobile units could serve high-demand locations, including festivals, military bases, college campuses, and corporate headquarters. Operators would use the platform for real-time fade tracking, safety verification, and patient record logging. Predictive AI simulations could be shown to the client on-site via tablet or AR headset to drive consultation and sales.

These alternative deployments expand the reach of the invention into direct-to-consumer and distributed service delivery models, allowing the predictive AI platform to function independently of any specific clinic-owned hardware. The licensing model can thus be applied to permanent medical facilities, residential community spaces, or temporary/movable treatment stations, while the core predictive, tracking, and compliance-enforcement features remain central to the invention.

While the core architecture is illustrated with a tattoo removal use case, the system and methods described are applicable to any dermatological treatment involving pigment or lesion reduction, including but not limited to scar fading, birthmark reduction, and sun damage reversal. The AI's predictive capabilities can be applied to a variety of aesthetic treatments by training the model on new, relevant datasets.

These additional applications include, but are not limited to: hair removal (e.g., face, underarm, bikini line, legs), skin rejuvenation (e.g., fine lines, wrinkles, collagen stimulation), reduction of vascular lesions (e.g., spider veins, rosacea), fading of hormonal pigmentation (e.g., melasma, pregnancy mask), and stretch mark fading. In each of these cases, the AI fade tracking, predictive simulation, and compliance logging functions operate in the same manner to quantify progress and forecast outcomes, ensuring broad and comprehensive intellectual property coverage.

BEST MODE FOR CARRYING OUT THE INVENTION

In the preferred embodiment, the system operates as a hardware-agnostic, cloud-based platform capable of integrating with commercially available dermatological imaging devices and energy-based treatment systems, including but not limited to Q-switched and picosecond lasers.

The core software stack is deployed on a secure cloud infrastructure, such as Amazon Web Services (AWS) or Microsoft Azure, utilizing containerized microservices for scalability and modularity.

The imaging subsystem preferably employs a multi-modal capture device with RGB and infrared sensors, a calibrated illumination source, and an alignment apparatus to ensure consistent focal distance and orientation between sessions. Image capture metadata, including ambient light detectors and temperature sensors, provides critical data for the normalization protocol.

The processing pipeline applies a lighting normalization algorithm anchored to skin micro-features, followed by dynamic skin mapping to align sequential images. The predictive model is preferably a non-linear regression framework augmented with a generative adversarial network (GAN) for producing predictive simulations. Training data comprises anonymized real-world patient cases supplemented with synthetically generated datasets to improve generalization across skin types and treatment modalities.

For data integrity and compliance, the platform uses a cryptographically verifiable ledger to log treatment session data, including image analysis results, treatment parameters, and predictive outputs. This ledger ensures that all clinical records are immutable, auditable, and compliant with applicable privacy regulations, including HIPAA. The use of this cryptographic audit chain is integral to the system's ability to operate as a reliable tool in a regulated medical environment.

In one deployment scenario, the platform is licensed to multiple clinics under a SaaS subscription model, enabling centralized AI model updates via federated learning. This configuration allows the AI to improve over time without requiring transmission of raw patient images, thereby preserving patient privacy while enhancing predictive accuracy.

The invention claimed is:

1. A computer-implemented method for tracking and predicting pigment change in human or non-human skin, comprising: a) receiving, by a computing device, a series of digital images of a skin region captured over multiple treatment sessions; b) processing said digital images using a processor to normalize for environmental lighting conditions, wherein said normalization comprises executing a lighting recalibration algorithm that performs a deformable registration using stable epidermal micro-landmarks and is conditioned by capture metadata comprising at least one of: focal length, exposure time, ISO, white balance, or illumination intensity; c) quantifying a change in a pigment pattern between said images by executing a machine learning model to estimate ink particle size reduction; d) forecasting a future pigment change by executing a non-linear regression model on a multi-dimensional dataset, said dataset comprising a plurality of variables including a Fitzpatrick skin type auto-detected from baseline images, cross-treatment interference data, fractional lattice detection data, and thermal profile mapping data; and e) generating for display, on a user interface, a progress metric and a confidence-weighted completion date derived from a patient-specific fade curve, wherein the predictive accuracy of said completion date is a direct technical result of the processing step (b) which reduces computational complexity by providing a pre-processed, consistent data input to said machine learning model.

2. The method of claim 1, wherein the method further comprises receiving said series of digital images from a mobile device for at-home consumer use.

3. The method of claim 1, wherein said pigment change comprises ink pigment change during tattoo removal.

4. The method of claim 1, wherein the machine learning model is trained on a dataset comprising real-world anonymized patient data and synthetic training data.

5. The method of claim 1, wherein the capturing step is performed with an alignment apparatus to ensure repeatable image orientation.

6. The method of claim 1, wherein the progress metric comprises a fade percentage value, a confidence score, and a historical trend line.

7. The method of claim 1, wherein the pigment change is quantified during a treatment selected from the group consisting of: hair removal, skin rejuvenation, reduction of vascular lesions, fading of hormonal pigmentation, and stretch mark fading.

8. The method of claim 1, wherein the method further comprises a pre-treatment notification module configured to transmit a client-specific pre-treatment instruction to a mobile device, said instruction personalized by an AI model and dynamically adjusted based on external data sources, and further comprising a post-treatment instruction module configured to detect an end-of-treatment event and automatically generate and dispatch time-stamped aftercare instructions to a client's mobile device, said instructions dynamically adjusted based on an AI evaluation of skin type, treatment parameters, and prior healing patterns.

9. The method of claim 1, wherein a predictive model is trained on and incrementally improved by a federated learning model, and further comprising a license enforcement module configured to:
monitor a geographic location of the client device or imaging device using a plurality of signals selected from the group consisting of: GPS, Wi-Fi triangulation, and device IP address;
verify said location against a geofenced boundary defined in a license agreement; and
enable or disable a core function based on the verification, wherein said license enforcement module is integral to ensuring the commercial viability and regulatory compliance of the system.

10. A system for tracking and predicting pigment change, comprising: a) a memory storing computer-executable instructions; b) a processor configured to execute the instructions to perform the following steps; c) receiving a series of digital images of a region of skin from an imaging device; d) operating a processing module to normalize said images for environmental factors by executing a machine learning algorithm that performs a deformable registration using stable epidermal micro-landmarks and corrects for lighting variance based on capture metadata comprising at least one of: focal length, exposure time, ISO, white balance, or illumination intensity; e) operating an analysis module to quantify pigment change between the normalized images by executing a micro-feature-based alignment algorithm and an image analysis algorithm that estimates ink particle size reduction; f) operating a prediction module to forecast a completion date by applying a non-linear regression model to a patient-specific fade curve, said model utilizing a plurality of variables selected from the group consisting of: a Fitzpatrick skin type auto-detected from baseline images, cross-treatment interference data, fractional lattice detection data, and thermal profile mapping data, wherein the forecasting accuracy is a technical result of the normalization performed in step (d), which improves the speed and efficiency of the computing system's processing unit; and g) operating a display device to present the forecast and progress metrics, including a dynamically-updating confidence score, to a user.

11. The system of claim 10, wherein the calibrated imaging device includes a calibrated light source for controlled illumination and a fixed optical distance from the skin.

12. The system of claim 10, wherein the multi-modal image data includes at least two different imaging modalities selected from the group consisting of: RGB, infrared, and hyperspectral.

13. The system of claim 10, wherein the prediction module's confidence score is tied to at least one of: image quality, lighting consistency, or the patient's adherence to the recommended treatment protocol.

14. The system of claim 10, wherein the system is further configured for cross-platform interoperability to interface with external health records (EHRs) or wellness applications to synthesize a holistic patient profile.

15. The system of claim 10, wherein the system further comprises a closed-loop compliance enforcement system configured to:
verify pre-treatment protocol compliance by analyzing real-time data from a wearable sensor or imaging device; and
automatically adjust treatment parameters in real-time or prevent the treatment procedure from starting until compliance is verified.

16. The system of claim 10, wherein the system is further configured to autonomously initiate and perform a treatment pass after verification of safety conditions and a confirmed pre-treatment protocol compliance, without continuous operator initiation.

17. The system of claim 10, wherein a predictive model is trained on and incrementally improved by a federated learning model, and further comprising a license enforcement module configured to:
monitor a geographic location of the client device or imaging device using a plurality of signals selected from the group consisting of: GPS, Wi-Fi triangulation, and device IP address;
verify said location against a geofenced boundary defined in a license agreement; and
enable or disable a core function based on the verification, wherein said license enforcement module is integral to ensuring the commercial viability and regulatory compliance of the system.

* * * * *